(12) United States Patent
Komiya et al.

(10) Patent No.: US 6,443,550 B1
(45) Date of Patent: Sep. 3, 2002

(54) IMAGE FORMING APPARATUS CAPABLE OF PERFORMING DENSITY IRREGULARITY CORRECTION USING DENSITY IRREGULARITY DATA SUITABLE FOR VARIOUS PRINTING CONDITIONS

(75) Inventors: Yasuhiro Komiya, Hino; Kenro Ohsawa; Ken Ioka, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/407,246

(22) Filed: Sep. 28, 1999

(30) Foreign Application Priority Data

Sep. 30, 1998 (JP) ............................................ 10-278178

(51) Int. Cl.⁷ ............................................ B41J 29/393
(52) U.S. Cl. ........................................................ 347/19
(58) Field of Search .............................. 347/19, 15, 43, 347/100, 5; 358/502; 73/54.01

(56) References Cited

U.S. PATENT DOCUMENTS 5,984,454 A * 11/1999 Takahashi et al. ............ 347/43

FOREIGN PATENT DOCUMENTS

JP 2748321 2/1998

* cited by examiner

*Primary Examiner*—Raquel Yvette Gordon
(74) *Attorney, Agent, or Firm*—Frishauf, Holtz, Goodman & Chick, P.C.

(57) ABSTRACT

An image forming apparatus has a recording head consisting of a plurality of recording elements for forming an image on a recording medium on the basis of given image data. A density irregularity characteristics data generating section generates density irregularity characteristics data on the basis of density irregularity data of a pattern generated with use of the recording head, and a plurality of attribute data used for generating the pattern. A density irregularity correction section corrects image data by using the density irregularity characteristics data generated in the density irregularity characteristics data generating section.

8 Claims, 14 Drawing Sheets

IMAGE FORMING APPARATUS CAPABLE OF PERFORMING DENSITY IRREGULARITY CORRECTION USING DENSITY IRREGULARITY DATA SUITABLE FOR VARIOUS PRINTING CONDITIONS

BACKGROUND OF THE INVENTION

The present invention relates to an image forming apparatus.

In accordance with development of electronic video devices, image formation is being performed with use of a recording head of an ink jet type or a thermal transfer type. Especially, a great amount of attention is being paid to the increase in the size of the head or the development of a multiple structure in the head, in order to achieve a high-speed recording.

However, in the case of image formation conducted by way of the ink jet method, for example, the amount of ink discharged from nozzles which constitute the recording head and the discharging direction from the nozzles vary from one nozzle to another, and therefore such variation in some cases appears as image irregularities such as lines. Such image irregularities become more prominent as the size of the head increases or the development of multiplying of the head proceeds. Consequently, stripe-like irregular patterns appear periodically on a formed image at intervals corresponding to the width of the recording head, and such image irregularities are factors for markedly deteriorating the quality of the image. Further, there is a problem that such image irregularities change with time over a long period of recording.

The specification of Japanese Patent No. 2748321 discloses an image forming apparatus which uses multiple heads capable of forming an image without creating a density irregularity in the image by electrically correcting the density irregularity.

However, the above-described conventional image forming apparatus operates with the use of only one print parameter as attribute data, and with this structure, it is not possible to correct an input image using the most appropriate density irregularity data, by considering various printing conditions in the formation of an image.

BRIEF SUMMARY OF THE INVENTION

The present invention has been proposed in consideration of the above-described circumstances, and the object thereof is to provide an image forming apparatus capable of performing the best possible correction onto an input image by storing a plurality of attribute data to be associated with density irregularity data of a test chart, and carrying out correction by selectively reading out a density irregularity data item corresponding to a given attribute data item.

In order to achieve the above-described object, there is provided, according to the present invention, an image forming apparatus comprising:

a recording head having a plurality of recording elements for forming an image on a recording medium on the basis of given image data;

a density irregularity characteristics data generating section for generating density irregularity characteristics data on the basis of density irregularity data of a pattern generated with use of the recording head, and a plurality of attribute data used for forming the pattern; and a density irregularity correction section for correcting image data by using the density irregularity characteristics data generated in the density irregularity characteristics data generating section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
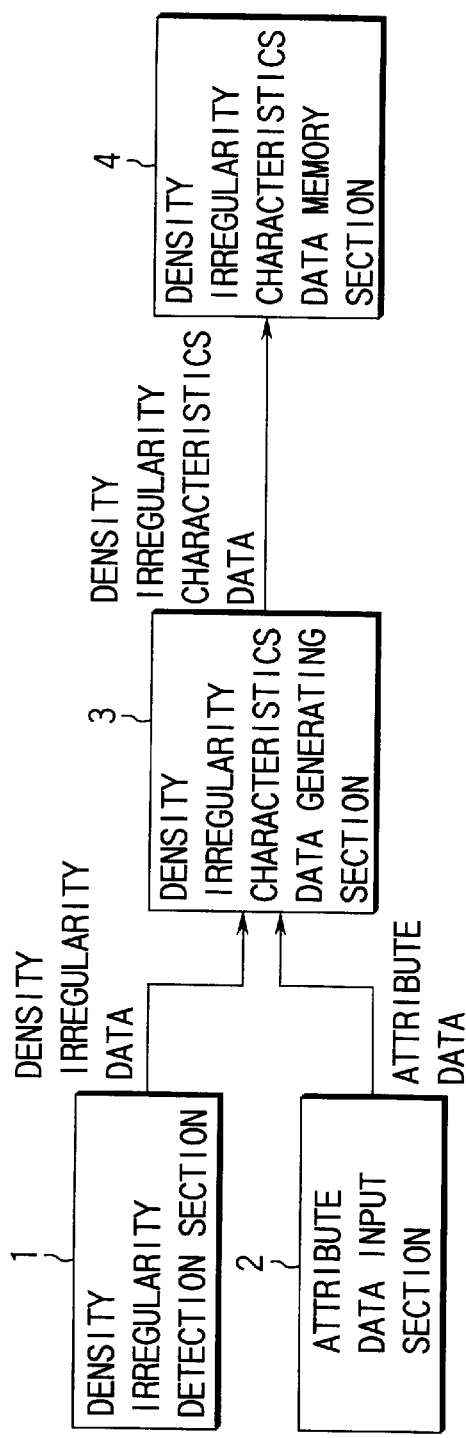
FIG. 1 is a diagram showing a flowchart of generation of density irregularity characteristics data, according to an embodiment of the present invention.

FIG. 1 is a diagram showing a flowchart of generation of density irregularity characteristics data according to an embodiment of the present invention. A density irregularity characteristics generating section 3 generates density irregularity characteristics data on the basis of density irregularity data of a test chart, detected by a density irregularity detection section 1, and a plurality of attribute data input to an attribute data input section 2. The attribute data includes, for example, data used for setting various modes for printer outputs. Specific examples of the attribute data are the printing resolution (360 dpi, 600 dpi, and the like), the printing mode (1 pass, 2 pass, and the like), the printing medium (coating sheet, film and the like), the binarization mode (error diffusion method, Dither method, or the like). Further examples of the attribute data include the temperature and humidity data at the time of printing, and print offset data. The density irregularity characteristics data thus generated are stored in a density irregularity characteristics data memory section 4 which is realized by a memory in the printer, the hard disk of a personal computer, or the like.

Figure 2:
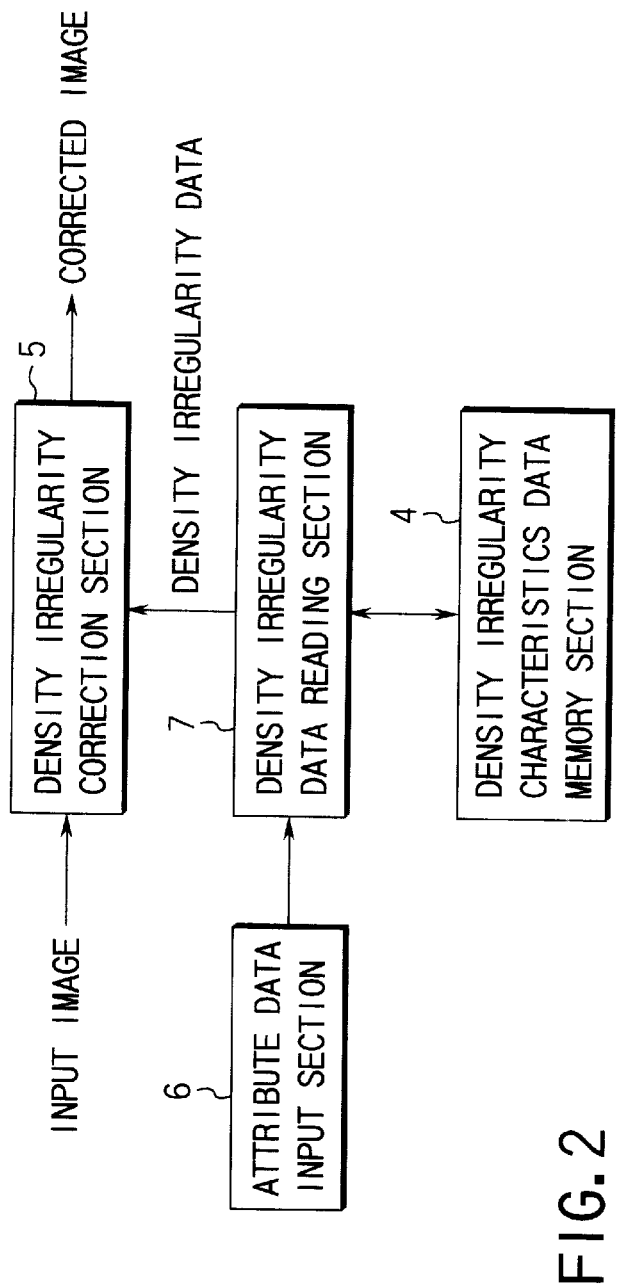
FIG. 2 is a diagram showing a flowchart of a density irregularity correction process.

FIG. 2 is a diagram showing a flowchart of the density irregularity correction operation. The density irregularity data reading section 7 selectively reads out density irregularity data corresponding to attribute data input from an attribute data input section 6, out of the density irregularity characteristics data stored in the density irregularity correction data memory section 4 described above, and the reading section 7 inputs the read out data to a density irregurality correction section 5. It should be noted that the attribute data are obtained from the main body of the printer in accordance with various settings of printer output. The density irregurality correction section 5 carries out correction onto an input image, by using the input density irregularity data, and then outputs the image as a corrected image.

As described above, a plurality of attribute data are stored to be associated with density irregularity data of a test chart, and an image is corrected by using corresponding density irregularity data read out selectively on the basis of a given attribute item. In effect, the optimal correction of input images can be achieved.

Figure 3:
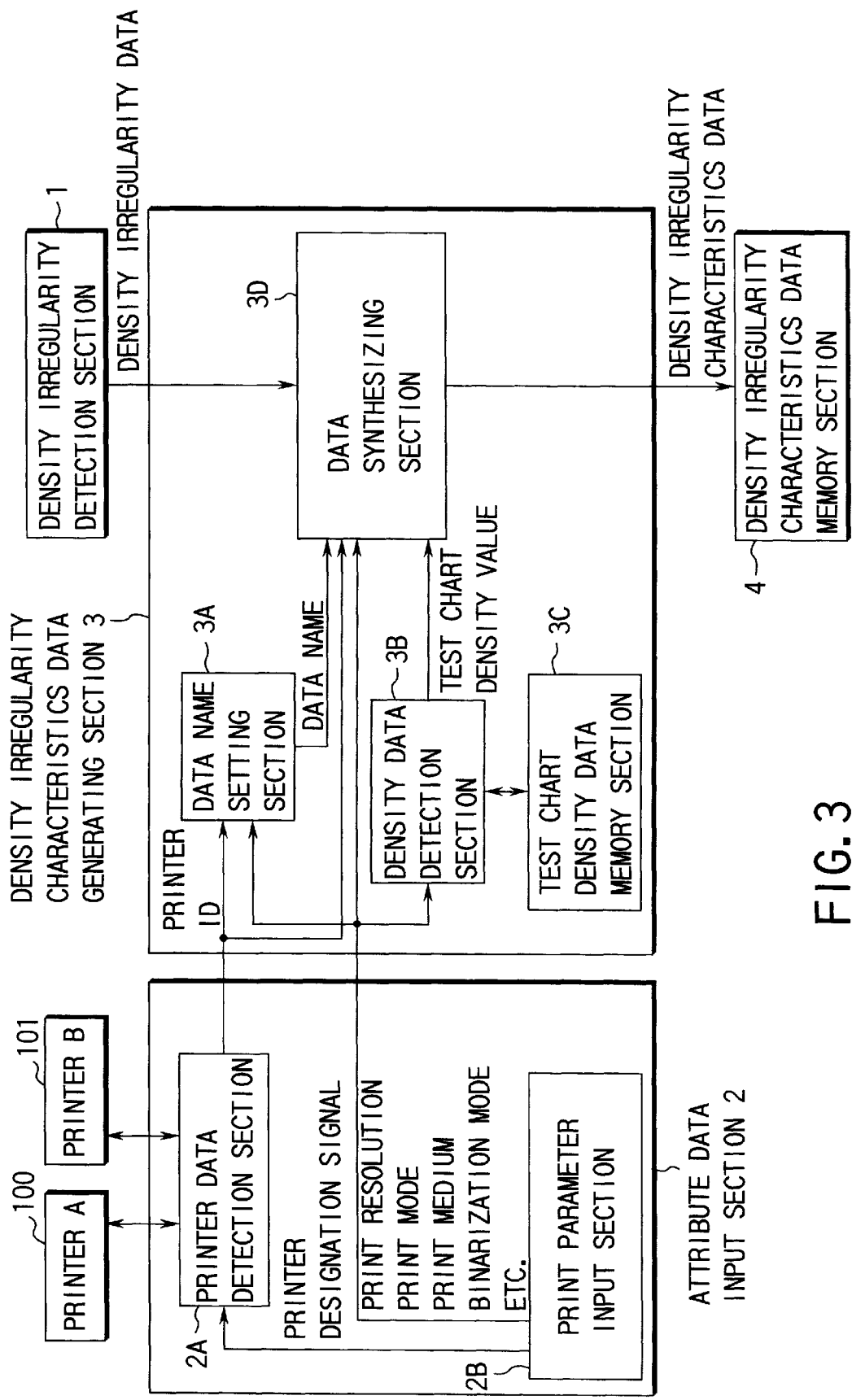
FIG. 3 is a diagram showing a first structural example for inputting attribute data and generating density irregularity characteristics data.

FIG. 3 is a diagram showing the first structural example of the operation including the inputting of attribute data and the generation of density irregularity characteristics data. An attribute data input section 2 consists of a printer data detection section 2A and a print parameter input section 2B. Meanwhile, the density irregularity characteristics data generating unit 3 consists of a data name setting section 3A, a density data detection section 3B, a test chart density data memory section 3C and a data synthesizing section 3D.

As can be seen from FIG. 3, to the print parameter input section 2B of the attribute data input section 2, various setting values including a print resolution, a print mode, a print medium, a binarization mode and an output printer are input as attribute data. To the printer data detection section 2A, a printer designation signal for designating an output printer (printer A100 or printer B101) is input from a printer parameter input section 2B. The printer data detection section 2A sends an output instruction signal of the test chart to the designated output printer (printer A100 or printer B101). A printer ID is sent back from the output printer.

In the density irregularity characteristics data generating section 3, the density irregularity data of the test chart, which is detected by the density irregularity detection section 1, and the attribute data input from the attribute data input section 2 are synthesized by the data synthesizing section 3D, and the synthesized data is sent to the density irregularity characteristics data memory section 4 as density irregularity characteristics data.

The attribute data input to the density irregularity characteristics data generating section 3 from the attribute data input section 2 are a printer ID output from the printer data detection section 2A, a print resolution output from the print parameter input section 2B, a print mode, a print medium, a binarization mode data and the like. The printer ID is output to the data name setting section 3A and the data synthesizing section 3D, and the print resolution, print mode, print medium and binarization mode data are output to the data name setting section 3A, the data synthesizing section 3D and the density data detection section 3B.

In the data name setting section 3A, the data file name of the density irregularity characteristics data is uniquely determined on the basis of the printer ID and the attribute data such as the print resolution, print mode, print medium, and binarization mode, and the determined data file name is output to the data synthesizing section 3D as data name. Further, in the density data detection section 3B, the test chart density values corresponding to the print resolution, print mode, print media and binarization mode are read out from the test chart density data memory section 3C, and then output to the data synthesizing section 3D.

In the data synthesizing section 3D, data items such as data name, printer ID, print resolution, print mode, print medium, binarization mode, and test chart density value are synthesized into a preset format data. The format data is synthesized with the density irregularity data of the test chart, which was detected in the density irregularity detection section 1, to generate density irregularity characteristics data, which is further sent to the density irregularity characteristics data memory section 4.

It should be noted that there are various types of print parameters described above, and therefore there are innumerable number of combinations thereof. In this case, it is necessary to detect innumerable number of density irregularity characteristics data. In order to reduce the number of necessary detection operations, the following mode is employed in this embodiment.

For example, there are various types of print media such as coat sheet, film and glossy paper, and there is no much difference in density irregularity between media. Therefore, the density irregularity data of the coat sheet are used as density irregularity data for a film and glossy paper. Therefore, in the data synthesizing section 3D, the density irregularity characteristics data name and attribute memory area are generated as if the density irregularity data of the coat sheet are those of the film or glossy data. Thus, by substituting the density irregularity data of a parameter with those of another parameter, the number of density irregularity detection operations can be markedly reduced. The substitution is effective not only for the print medium, but also for different binarization modes (error diffusion method and Dither method).

Figure 4:
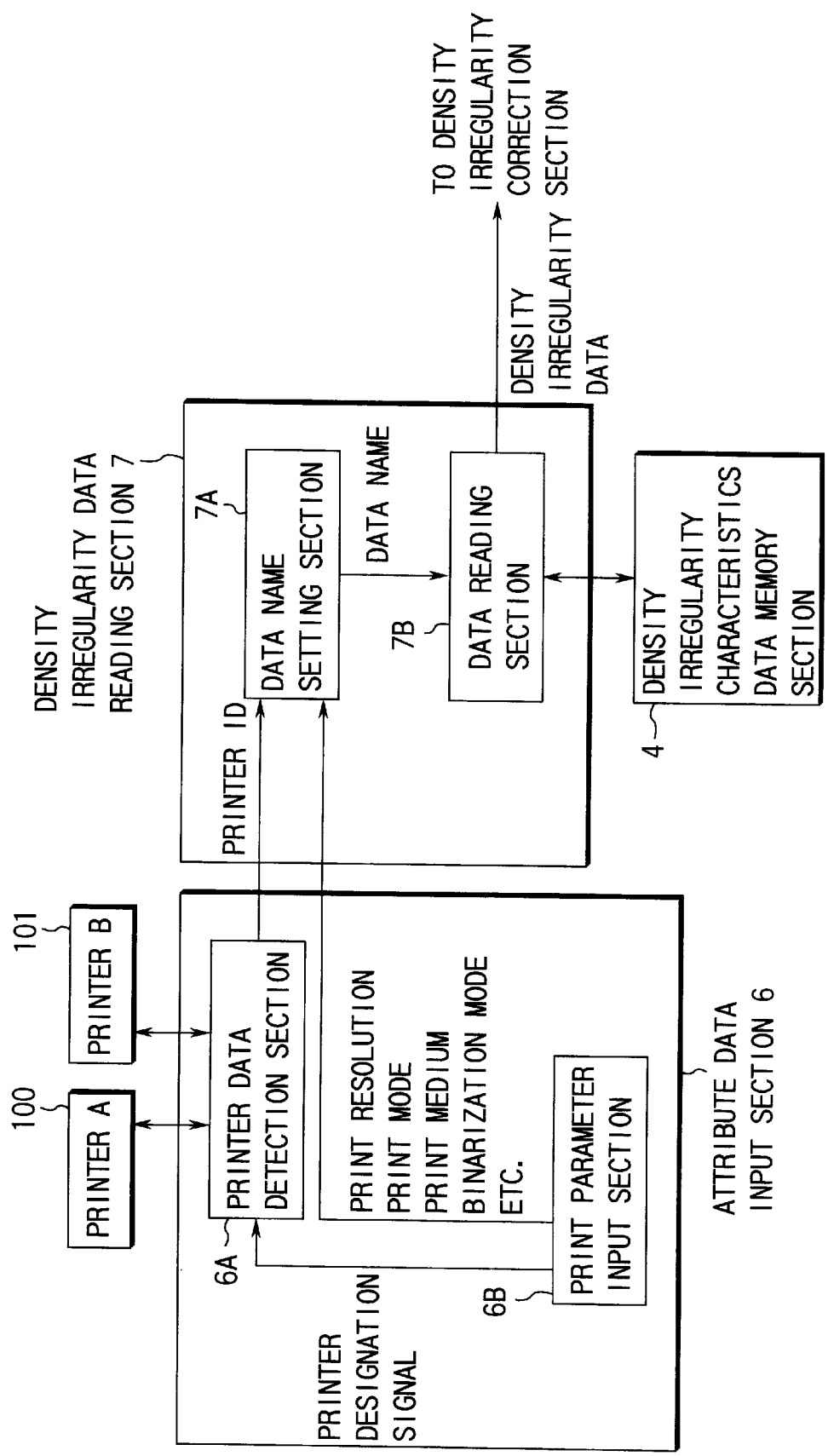
FIG. 4 is a diagram showing a first structural example for reading density irregularity data.

FIG. 4 is a diagram showing the first structural example of reading-out of density irregularity data described above. As shown in this figure, a density irregularity data reading section 7 consists of a data name setting section 7A and a data reading section 7B. In the data name setting section 7A of the density irregularity data reading section 7, the data name of the density irregularity characteristics data used for correction of an input image is determined on the basis of the printer ID read from the printer data detection section 6A of the attribute data input section 6, and the print resolution, the print mode, the print medium, and the binarization mode data read from the print parameter input section 6B. In the data reading section 7B, a density irregularity characteristics data is selected from the density irregularity characteristics data memory section 4 on the basis of the data name, and the selected data is output to the density irregularity correction section.

It should be noted that when density irregularity characteristics data is to be read out with a print parameter set by the data reading section 7B, there may be a case where there is no such density irregularity characteristics data. In such a case, one possibility is to output an error display, and another is to replace it with the closest data or default data.

Figure 5:
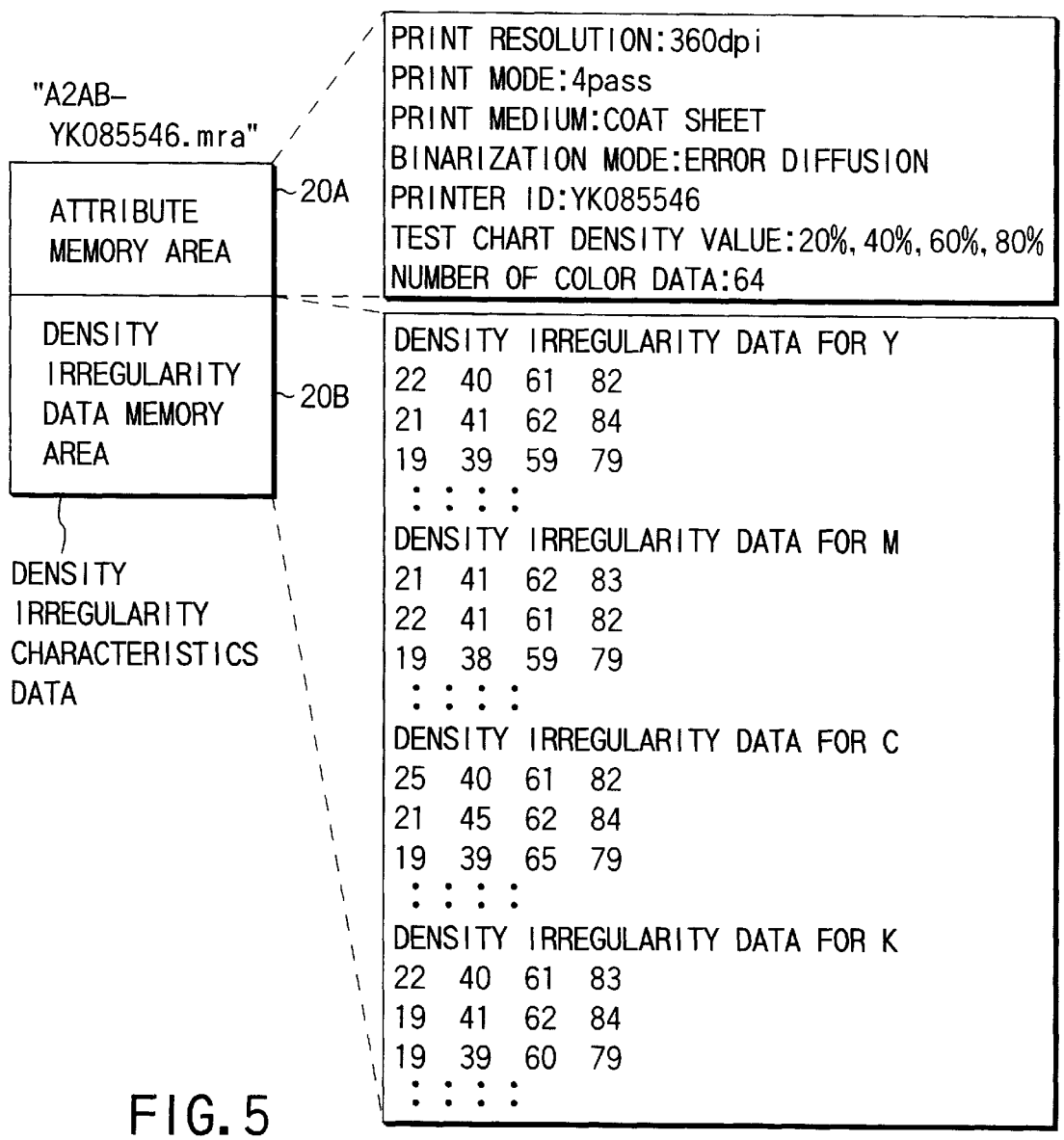
FIG. 5 is a diagram showing a first structural example of density irregularity characteristics data.

FIG. 5 is a diagram showing the first structure of the above-described density irregularity characteristics data. As shown in FIG. 5, the density irregularity characteristics data is divided and stored in an attribute memory area 20A and a density irregularity data memory area 20B. In the attribute memory area 20A, data such as the print resolution, print mode, print medium, binarization mode, printer ID, test chart density value (target value), the number of data for each color (the number of nozzles of the printer) are written. Further, in the density irregularity data memory area 20B, density irregularity data is written for each color (Y (yellow), M (magenta), C (cyan), K (black)). Here, it should be noted that one density irregularity data is detection density data corresponding to each image position for one period of an irregularity. For example, in the density irregularity data for Y, shown in the figure, the numerals of each line are a density value (%) corresponding to each nozzle of the printer, and the numerals of each column indicate a gradation (4 gradations in the figure).

Figure 6:
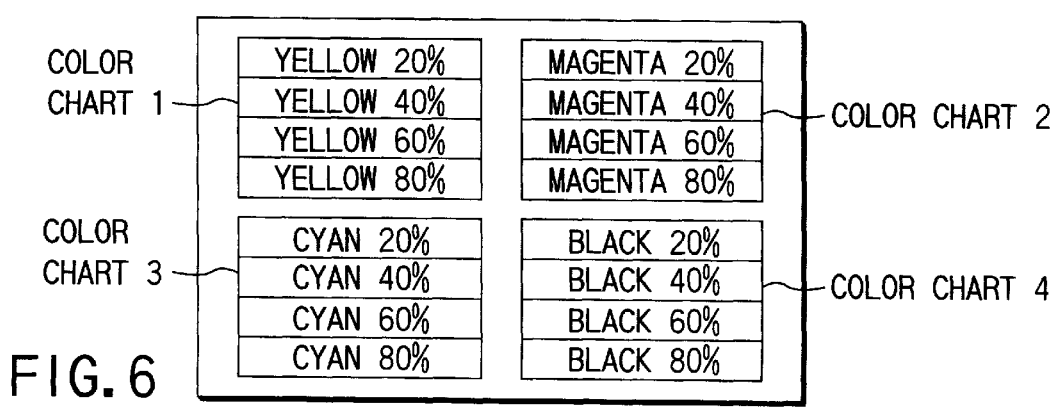
FIG. 6 is a diagram showing a first structural example of a test chart.

FIG. 6 is a diagram showing the first structure of the above-described test chart. The test chart data consists of color chart images 1 to 4 of four gradations for each of the colors Y, M, C and K. The numeral for each color chart indicates a target density value (%).

Figure 7:
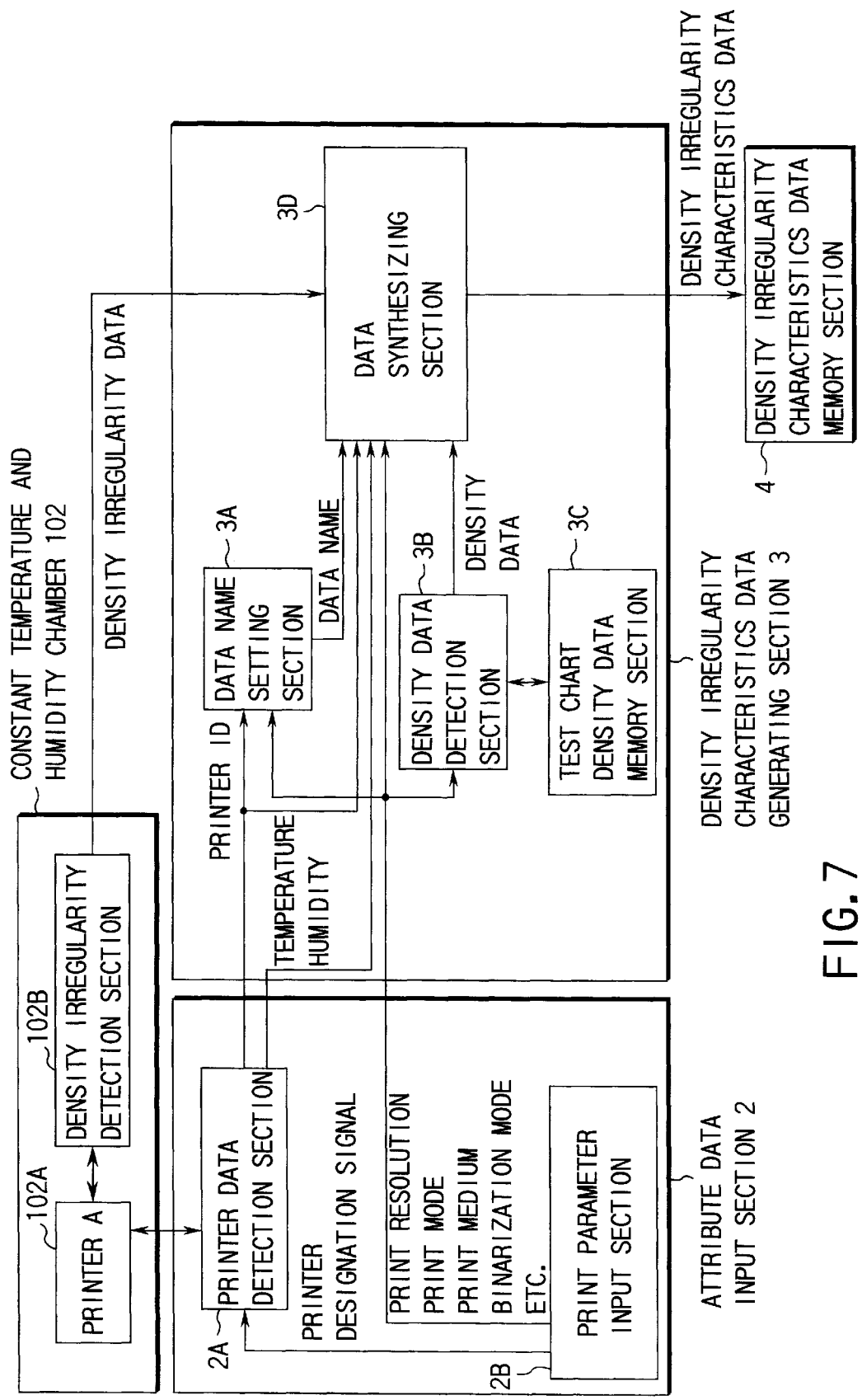
FIG. 7 is a diagram showing a second structural example for inputting attribute data and generating density irregularity characteristics data.

FIG. 7 is a diagram showing the second structural example for inputting attribute data and generating density irregularity characteristics data, and the structures of the attribute data input section 2 and the density irregularity characteristics data generating section 3 are exactly the same as those shown in FIG. 3. In this structural example, the printer 102A (corresponding to the printer A100 in FIG. 3) and the density irregularity detection section 102B (corresponding to the density irregularity detection section 1) are placed in an environment where the temperature and humidity are controlled, for example, a constant temperature and humidity chamber 102. The temperature and humidity at the density irregularity detection are sent as one of the attribute data, to the printer data detection section 2A of the attribute data input section 2. The temperature and humidity data are sent from the printer data detection section 2A to the data synthesizing section 3D of the density irregularity characteristics data generating section 3, and these data are added when the density irregularity characteristics data is generated.

Figure 8:
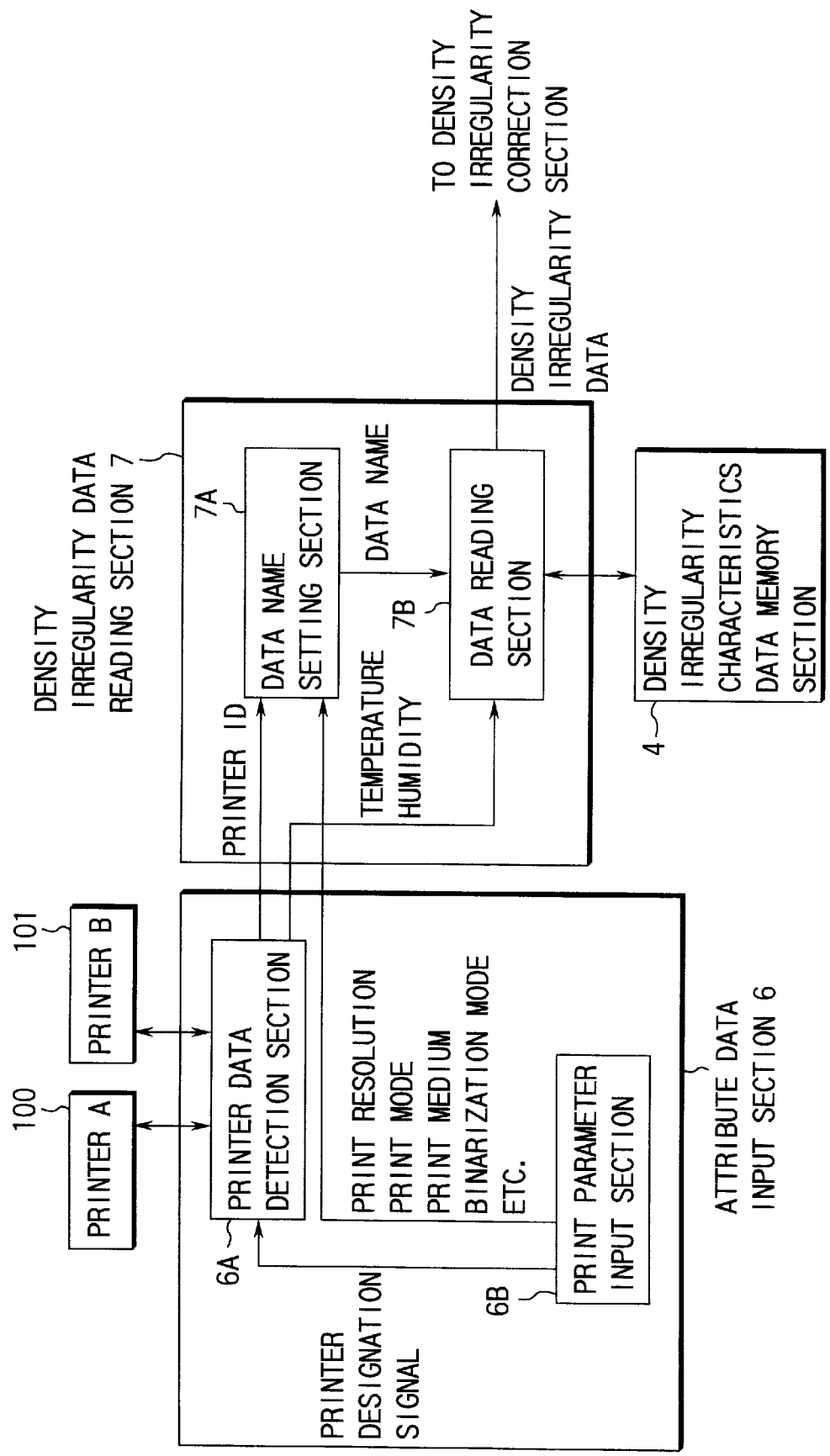
FIG. 8 is a diagram showing a second structural example for reading density irregularity data.

FIG. 8 is a diagram showing the second structural example for reading density irregularity data described above. The structure of the attribute data input section 6 and the density irregularity data reading section 7 is similar to that shown in FIG. 4. Here, when density irregularity data is output to the density irregularity correction section, the temperature and humidity data are sent from the printer in use (printer A100 or printer B101) to the printer data detection section 2A of the attribute data input section 2. Further, these data are sent from the printer data detection section 6A to the data reading section 7B of the density irregularity data reading section 7. In the data reading section 7B, the density irregularity data is selected from the density irregularity characteristics data memory section 4, on the basis of the temperature and humidity data in addition to the data name, print resolution, print mode, print medium, and binarization mode.

Figure 9:
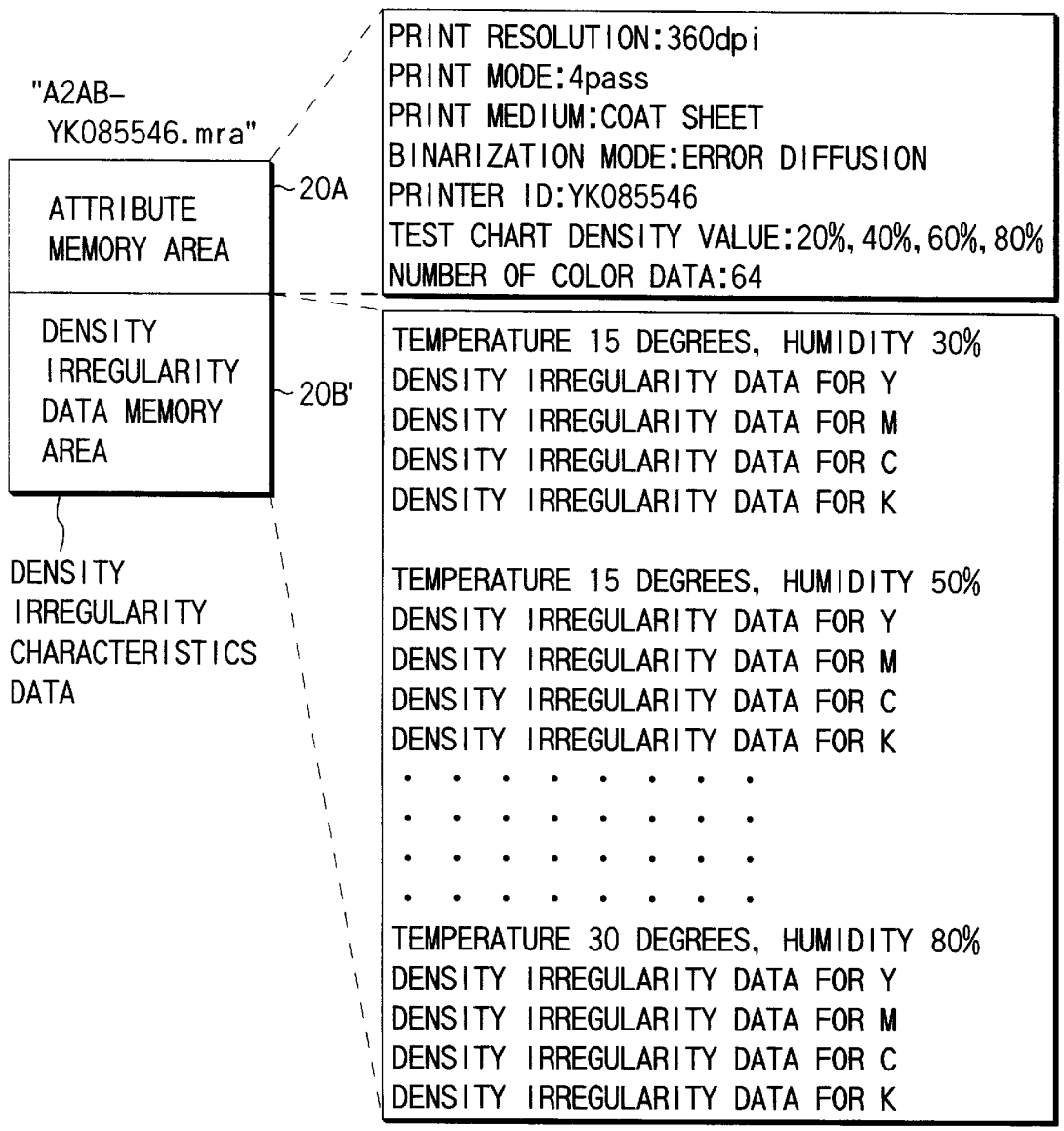
FIG. 9 is a diagram showing a second structural example for reading density irregularity characteristics data.

FIG. 9 is a diagram showing the second structural example of the density irregularity characteristics data. The data structure of the attribute memory area 20A is similar to that shown in FIG. 5; however the temperature and humidity data at the time of detection have been add to the data of the density irregularity memory area 20B' for each color.

Figure 10:
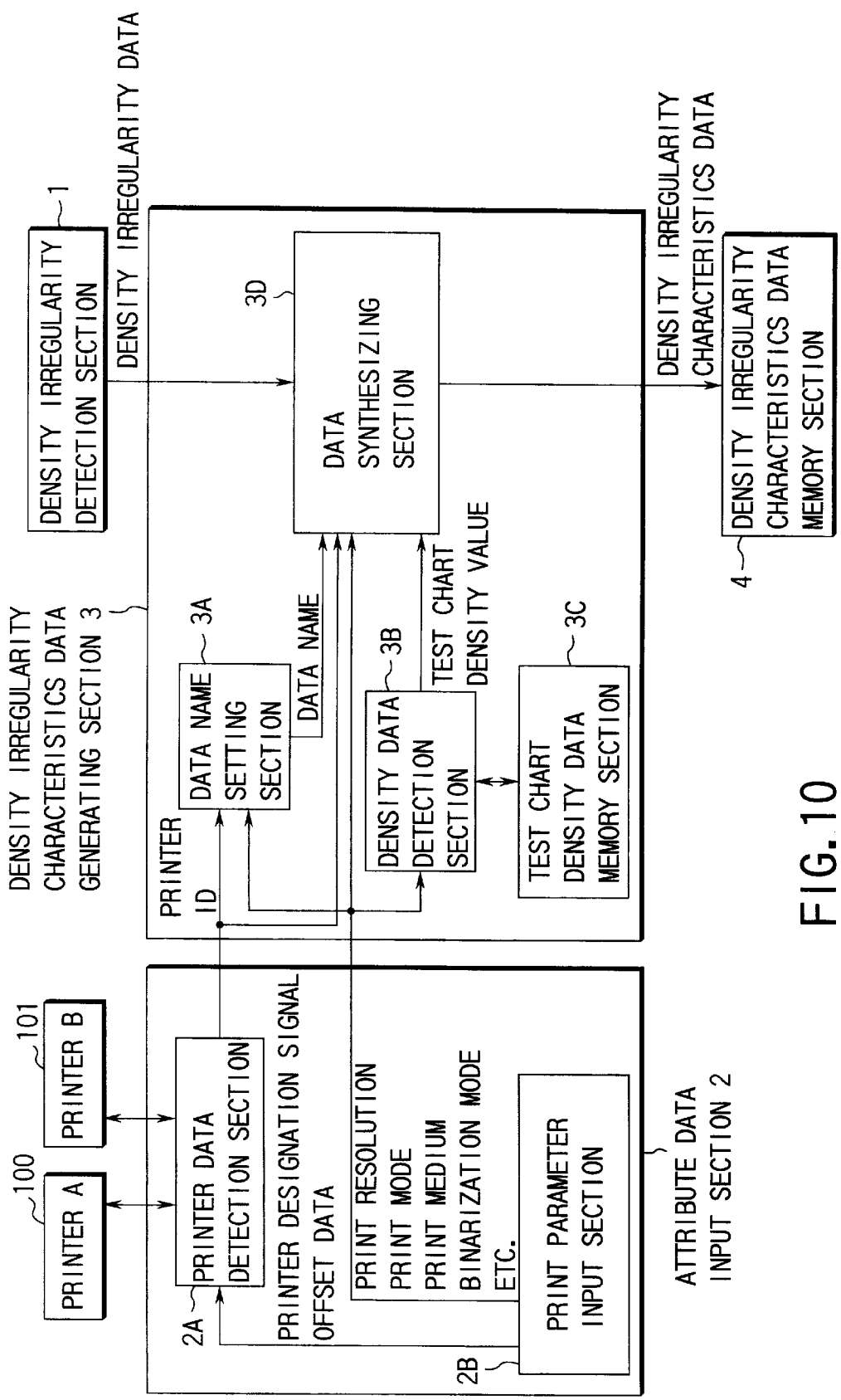
FIG. 10 is a diagram showing a third structural example for inputting attribute data and generating density irregularity characteristics data.

FIG. 10 is a diagram showing the third structural example for inputting attribute data and generating density irregularity characteristics data, described above. The structure of the attribute data input section and the density irregularity characteristics data generating section is similar to that of the first structural example. In the third structural example, the density irregularity offset data of the test chart is input from the print parameter input section 2B of the attribute data input section 2 to the printer data detection section 2A. Here, the density irregularity offset is defined by the distance taken from the tip end of the output medium to the print position of the image data. The density irregularity offset data is sent from the printer data detection section 2A to the data synthesizing section 3D of the density irregularity characteristics data generating section 3, and then added to the attribute memory area 20A shown in FIG. 9, at the time of the generation of the density irregularity characteristics data.

Figure 11:
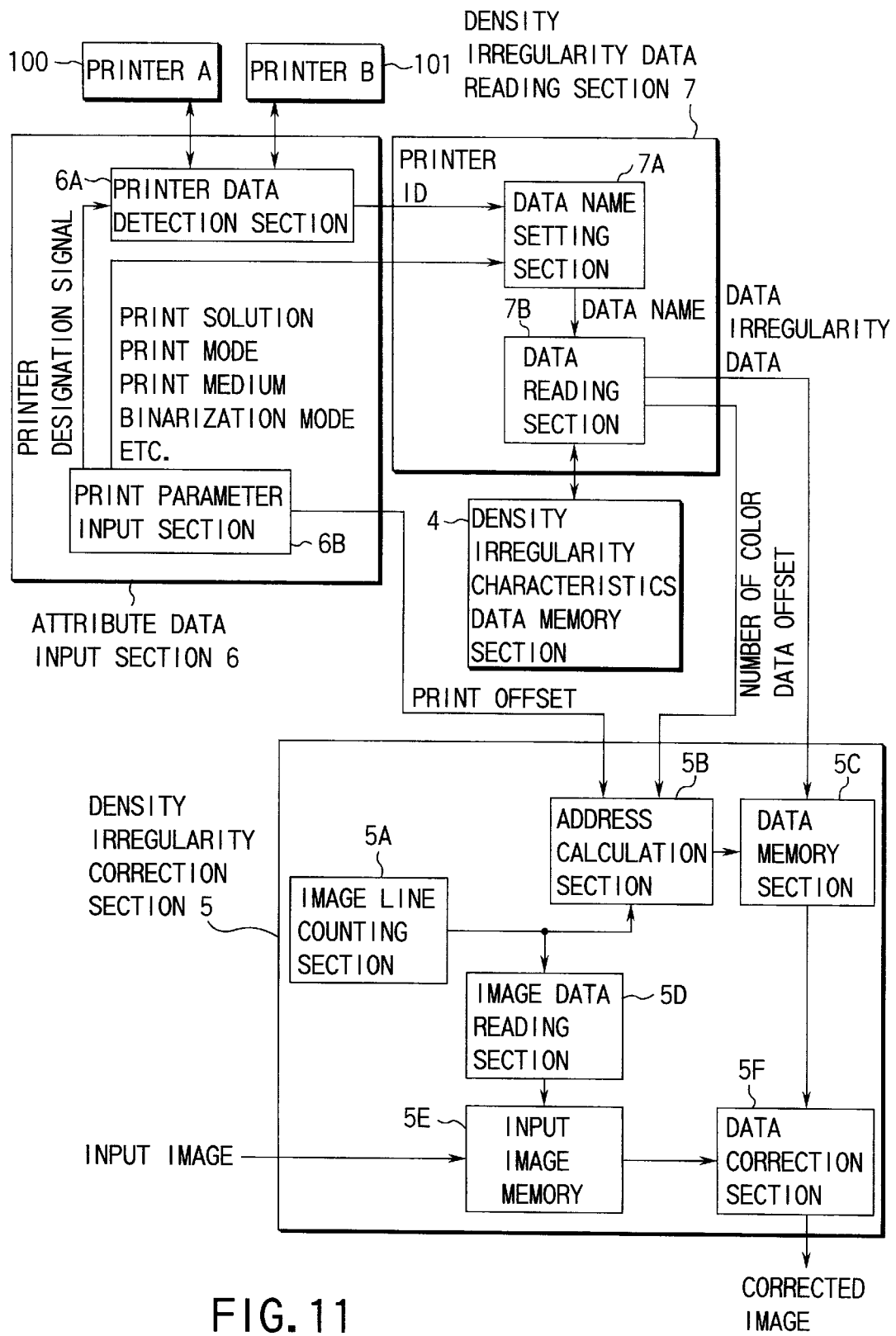
FIG. 11 is a diagram showing a third structural example for reading density irregularity data.

FIG. 11 is a diagram showing the third structural example for reading the density irregularity characteristics data, described above. The structure of the attribute data input section 6 and the density irregularity data reading section 7 is similar to that shown in FIG. 4. Here, when the density irregularity data is output to the density irregularity correction section 5, the print offset data is sent from the print parameter input section 6B of the attribute data input section 6 to the density irregularity correction section 5. Further, the data reading section 7B of the density irregularity data reading section 7 reads out the density irregularity data containing the density irregularity offset from the density irregularity characteristics data memory section 4, and sends it to the density irregularity correction section 5.

As shown in FIG. 11, the density irregularity correction section consists of an image line count section 5A, an address calculation section 5B, a data memory section 5C, an image data reading section 5D, an input image memory 5E and a data correction section 5F.

Figure 12:
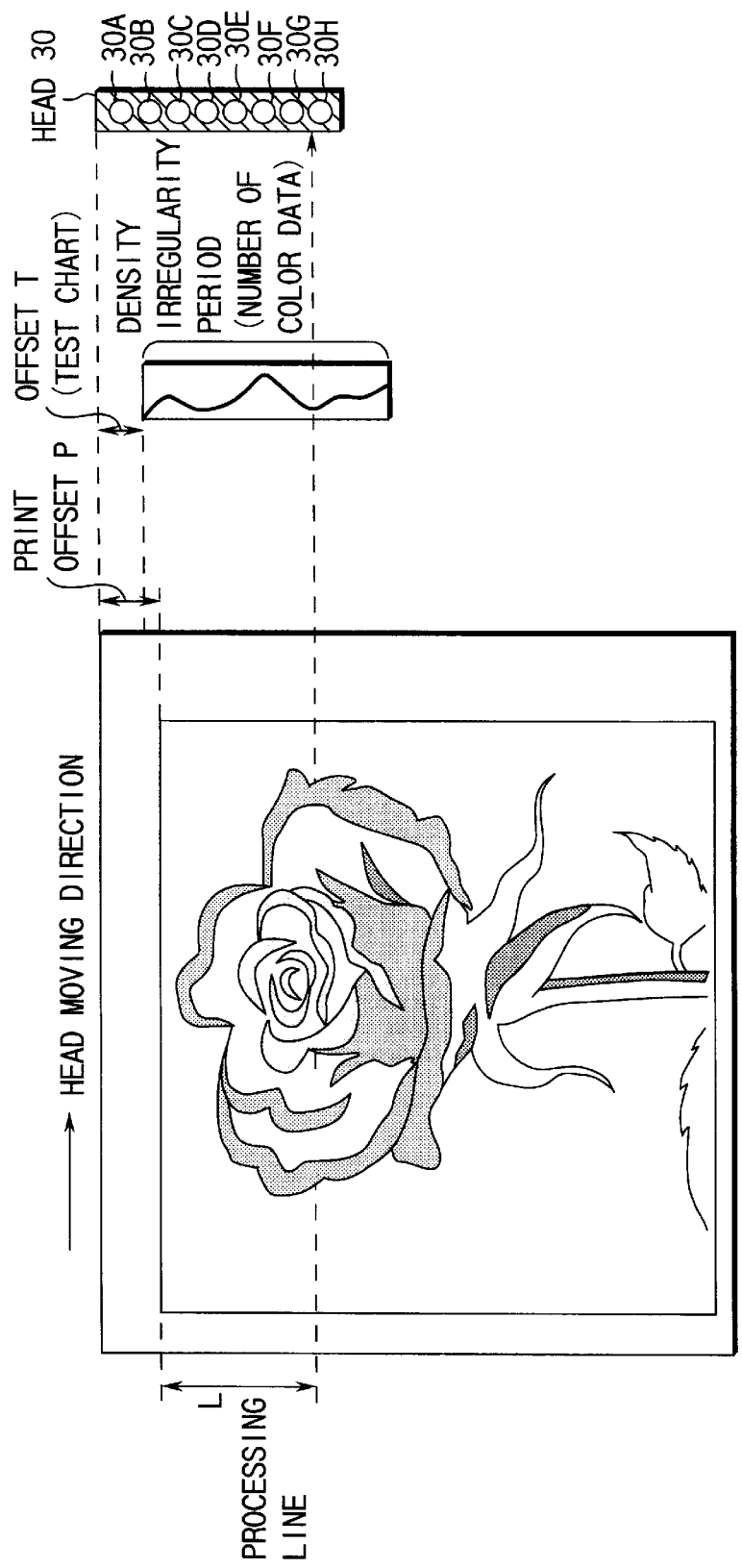
FIG. 12 is a diagram illustrating the process of the address calculation section 5B.

FIG. 12 is a diagram illustrating the process by the address calculation section 5B. The image line count section 5A counts image lines to be processed, such as shown in FIG. 12, and outputs the count value L to the address calculation section 5B and the image data reading section 5D. When an address corresponding to the count value L is given by the image data reading section 5D to the input image memory 5E, an image data corresponding to the address is selected and sent to the data correction section 5F.

Further, the address calculation section 5B calculates a density irregularity data reading address using the equation:

the density irregularity data reading address=MOD $(L+P-T, S)$ wherein L is an input count, P is a print offset, T is a test chart offset, and S is a density irregularity period (number of color data in each), and sends the calculated data to the data memory section 5C. Here, MOD (A, B) represents a residual when A is divided by B. Thus, the density irregularity data corresponding to the address is selected, and then sent to the data correction section 5F. The data correction section 5F corrects an image data input with use of the density irregularity data, and outputs the corrected image.

As described above, for correcting L lines of an image to be processed, the corresponding address can be calculated by utilizing the offset from the above-described equation even if which one of the nozzles 30A to 30H of the head 30 prints the L line. In other words, by using an offset, it becomes unnecessary to designate the actual print nozzle position for the address calculation, that is, to specify which density irregularity data should be used for correction. Further, it is also effective for the case where each line is printed by a plurality of nozzles, which are used in the case of 2 or 4 pass printing.

Figure 13:
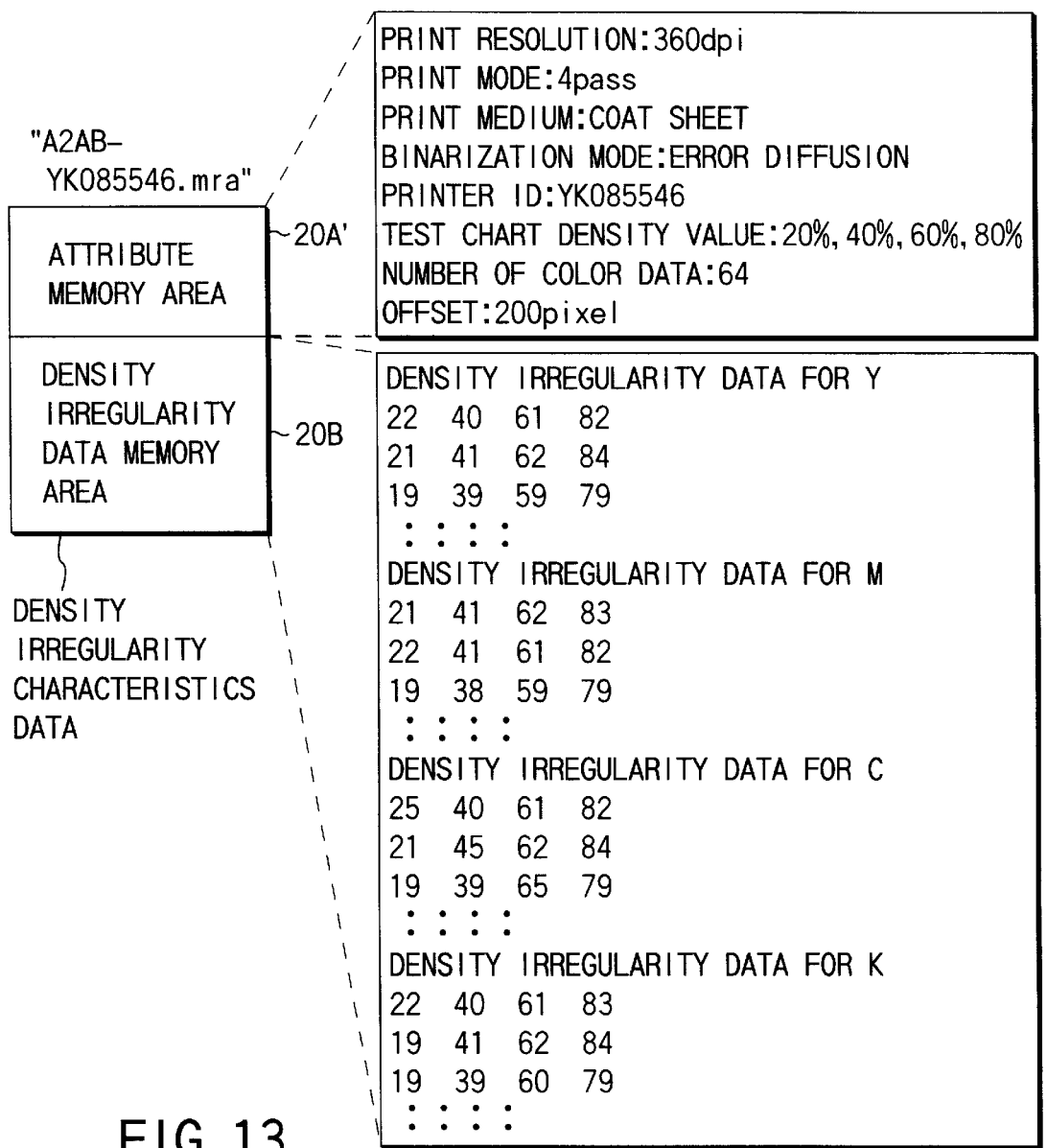
FIG. 13 is a diagram showing a third structural example of density irregularity characteristics data.

FIG. 13 is a diagram showing the third structural example of the density irregularity characteristics data. The data structure of the density irregularity data memory area 20B is similar to that shown in FIG. 5. The offset data has been added to the attribute memory area 20A'.

Figure 14:
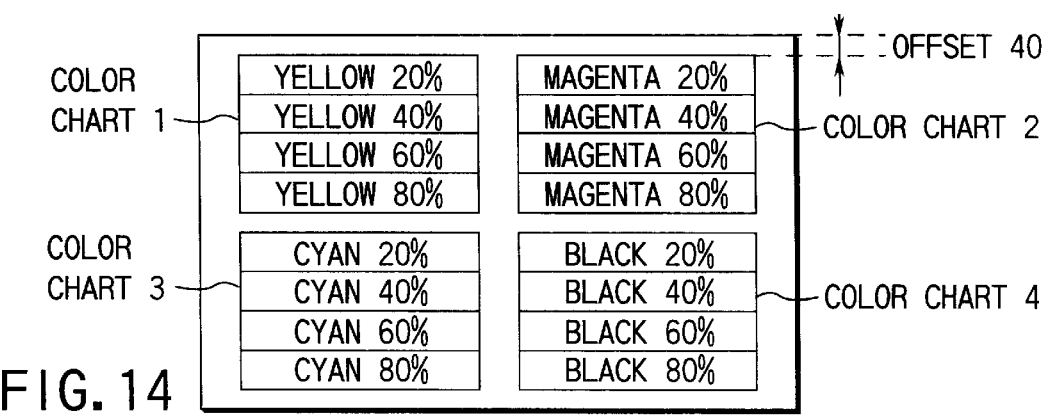
FIG. 14 is a diagram showing a second structural example of a test chart.

FIG. 14 is a diagram showing the second structure of the test chart, and illustrating the relationship between color charts 1 to 4 which constitute the test chart and the offset 40.

Figure 15:
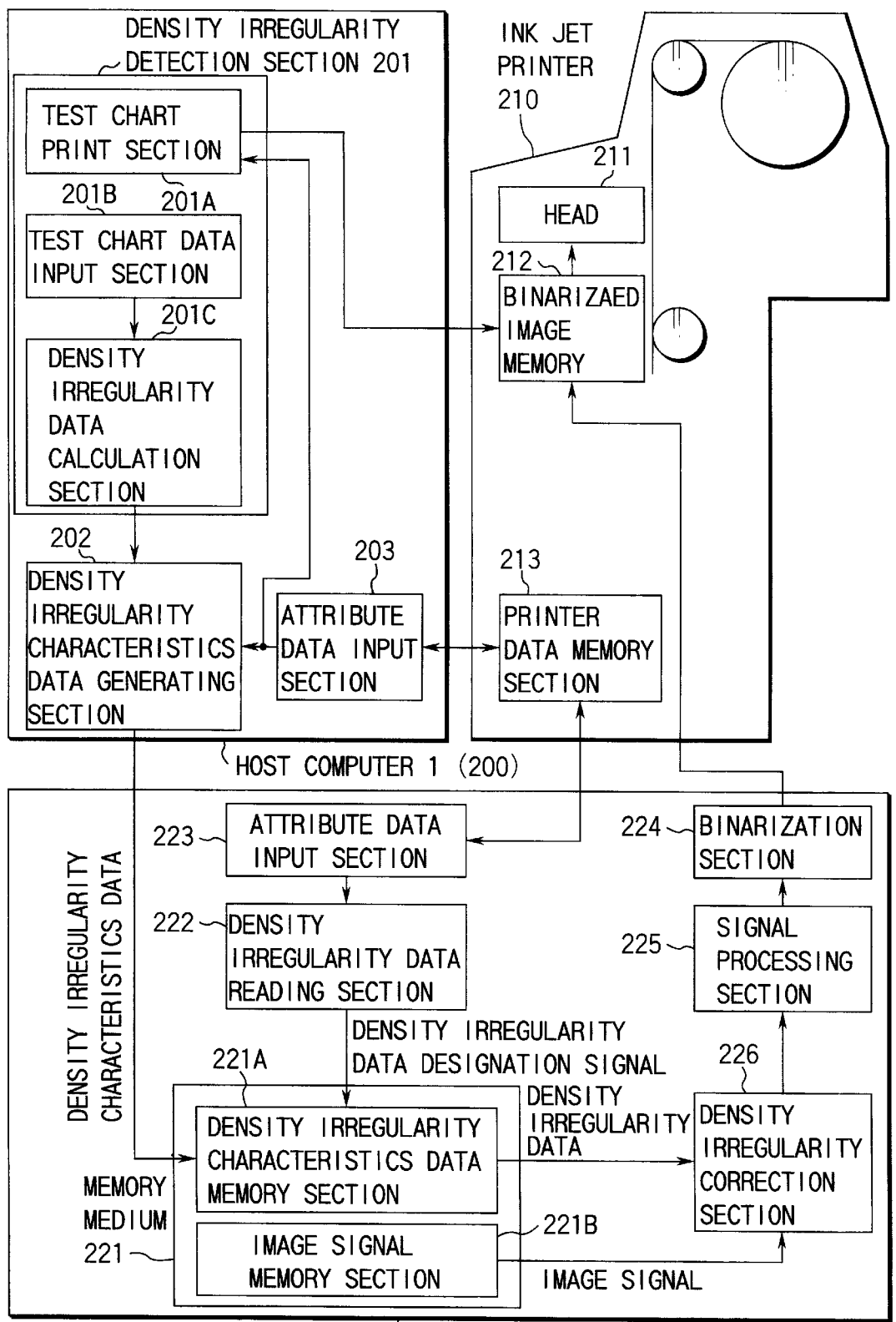
FIG. 15 is a diagram showing a first structural example of a density irregularity correction system.

FIG. 15 is a diagram showing the first structural example of the density irregularity correction system, which consists of a host computer 1 (200), an ink-jet printer 210 and a host computer 2 (220), which are provided separately. The first structural example is characterized in that density irregularity is detected by the host computer 1 (200) and the density correction is carried out in the host computer 2 (220) on the basis of the density irregularity. For example, the host computer 1 (220) can be used at the time of the shipment of the product from, for example, the factory, whereas the host computer 2 (220) can be used by the user. It should be noted that the host computer 1 (200) and the host computer 2 (220) are of the same type.

The host computer 1 (200) includes a density irregularity detection section 201 having a test chart print section 201A, a test chart data input section 201B and a density irregularity data calculation section 201C, a density irregularity characteristics data generating section 202 and an attribute data input section 203. Further, the ink-jet printer 210 includes a head 211, a binarized image memory 212 and a printer data memory section 213. Further, the host computer 2 (220) includes an attribute data input section 223, a density irregularity data reading section 222, a memory medium 221 having a density irregularity characteristics data memory section 221A and an image signal memory section 221B, a binarization section 224, a signal processing section 225 and a density irregularity correction section 226.

In the above-described structure, the density irregularity data calculation section 201C in the host computer 1 (200) calculates density irregularity data on the test chart data input from the test chart data input section 201B, and sends the calculated result to the density irregularity characteristics data generating section 202. Further, the printer data stored in the printer data memory section 213 in the ink-jet printer 210 is sent to the density irregularity characteristics data generating section 202 via the attribute data input section 203. The density irregularity characteristics data generating section 202 generates density irregularity characteristics data on the basis of the density irregularity data and the printer data from the attribute data input section 203. Thus generated density irregularity characteristics data is sent to the host computer 2 (220) via a network (not shown) or a memory medium, and then stored in the density irregularity characteristics data memory section 221A in the memory medium 221.

The printer data stored in the printer data memory section 213 in the ink-jet printer 210 is sent further to the test chart print section 201A via the attribute data input section 203. The test chart print section 201 prints out a test chart on the basis of the input attribute data. The data regarding the test chart is stored in a binarized image memory 212 in the ink-jet printer 210. Thus, the test chart is stored in advance as binarized data in a binarized image memory 212, and therefore the binarization at the time of printing becomes unnecessary, thus making it possible to achieve a high-speed printing. Further, a test chart is made in advance for each of the print resolution, print mode, print medium and binarization mode, and a test chart to be printed is selected on the basis of the parameter of the attribute data input section 203.

In the meantime, the printer data stored in the printer data memory section 213 in the ink-jet printer 210 is input as attribute data from the attribute data input section 223 of the host computer 2 (220), and then sent to the density irregularity data reading section 222. The density irregularity data reading section 222 generates a density irregularity data designation signal for designating a designation irregularity characteristics data to be utilized, on the basis of the attribute data input from the attribute data input section 223, and sends it to the density irregularity characteristics data memory section 221A. With this designation, the corresponding density irregularity data is read from the density irregularity characteristics data memory section 221A, and sent to the density irregularity correction section 226. The density irregularity correction section 226 carries out the correction of the image signal stored in the image signal memory section 221B on the basis of the density irregularity data, and then sends the corrected data to the signal processing section 225. The signal processing section 225 converts the corrected image signal into that of a predetermined format, and sends it to the binarization section 224. The corrected image signal is binarized by the binarization section 224, and then stored in the binarized image memory 212 in the ink-jet printer 210, where the signal is used as a drive signal for the head 211.

Figure 16:
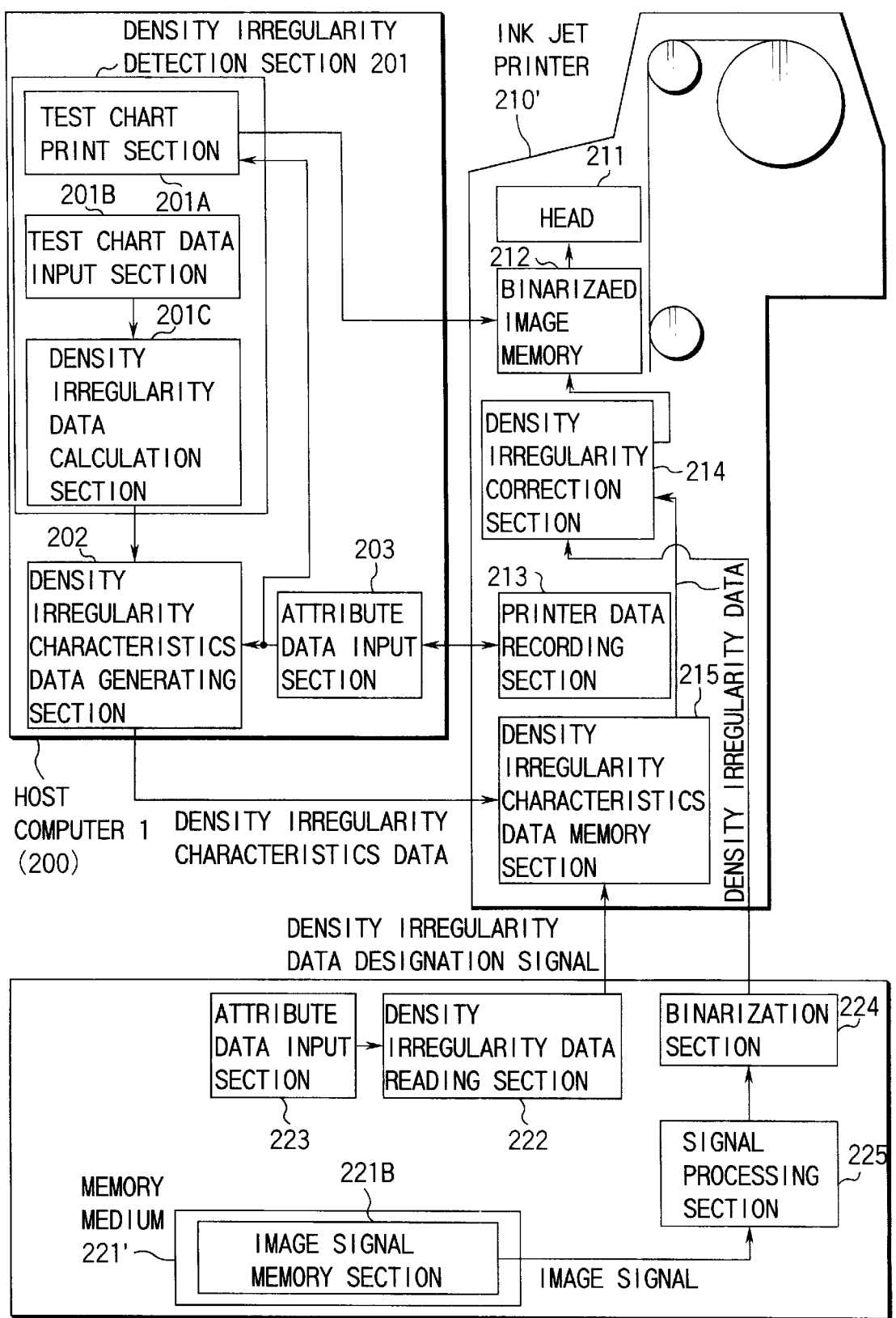
FIG. 16 is a diagram showing a second structural example of a density irregularity correction system.

FIG. 16 is a diagram showing the second structural example of the density irregularity correction system, and this system consists of a host computer 1 (200), an ink-jet printer 210' and a host computer 2 (220'). The structure of the host computer 1 (200) is similar to that of the first structural example. The second structural example is characterized in that the correction of the density irregularity is carried out within the ink-jet printer 210', and the density irregularity characteristics data generated in the density irregularity characteristics data generating section 202 of the host computer 1 (200) is stored in the density irregularity characteristics data memory section 215 in the ink-jet printer 210'. The density irregularity characteristics data memory section 215 may be made of, for example, a memory card which detachable from the ink-jet printer 210'. Alternatively, the density irregularity characteristics data may be rewritten at the time of maintenance regularly carried out, such as the replacement of the head 211. (In the case where a memory card is used, the card itself is replaced.)

The density irregularity data reading section 222 in the host computer 2 (220') generates a density irregularity data designation signal for designating a designation irregularity characteristics data to be utilized, on the basis of the attribute data input from the attribute data input section 223, and sends it to the density irregularity characteristics data memory section 215 of the ink-jet printer 210'. With this designation, the corresponding density irregularity data is read, and sent to the density irregularity correction section 214.

Meanwhile, an image signal stored in the image signal memory section 221B in the memory medium 221' of the host computer 2 (220') is read out and converted by the signal processing section 225 into that of a predetermined format. The converted image signal is binarized by the binarization section 224, and then the binarized signal is sent to the density irregularity correction section 214 of the ink-jet printer 210'. In the density irregularity correction section 214, the density irregularity of the binarized image signal is corrected using the density irregularity data, and then it is sent to the binarized image memory 212, where the signal is used as a drive signal for the head 211.

It should be noted that in the second structure described above, an image signal binarized in the host computer 2 (220') is subjected to the density irregularity correction in the ink-jet printer 210'; however it is also possible that a signal processing section or a binarization section is provided in the ink-jet printer 210'.

Figure 17:
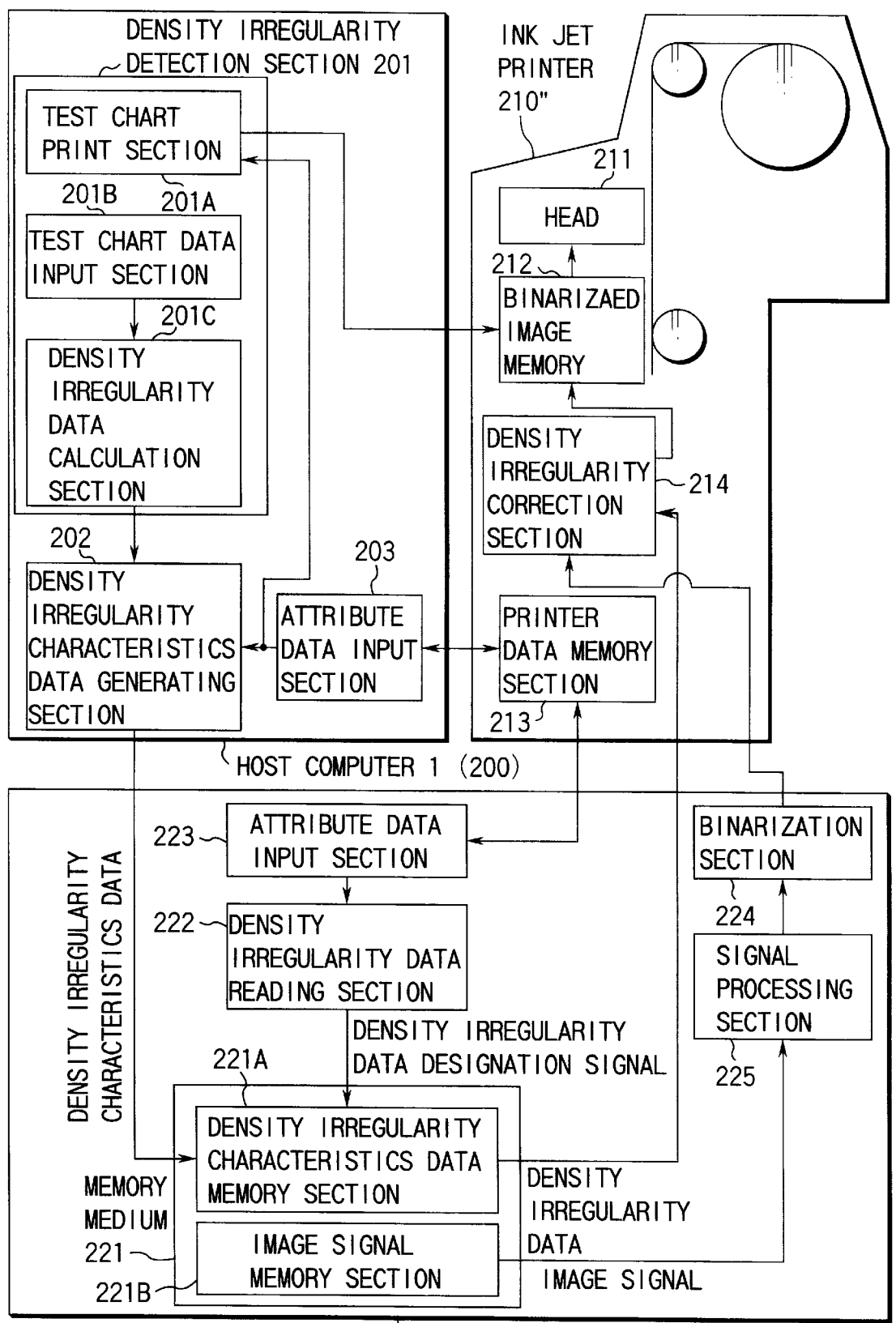
FIG. 17 is a diagram showing a third structural example of a density irregularity correction system.

FIG. 17 is a diagram showing the third structural example of the density irregularity correction system, and this system consists of a host computer 1 (200), an ink-jet printer 210" and a host computer 2 (220"). The structure of the host computer 1 (200) is similar to that of the first structural example. In the case where the density irregularity characteristics data memory section is provided within the ink-jet printer, the cost of the printer itself is increased. In order to avoid this, in the third structural example, the density irregularity correction itself is carried out inside the ink-jet printer 210"; however the density irregularity data used for the density irregularity correction is stored in the density irregularity characteristics data memory section 221A of the memory medium 221 in the host computer 2 (220"). The structure of the rest of the section is similar to that of the second structural example. As described with reference to FIGS. 7 to 9, in the case where density irregularity characteristics data is generated in consideration of temperature and humidity, it is expected that the amount of the density irregularity characteristics data becomes enormous. For such circumstances, the third structural example is more effective. Since the atmospheric temperature greatly varies depending upon the time when the printing is carried out, it is preferable that the density irregularity data should be selected in accordance with the temperature as attribute data, immediately before the printing is carried out. Therefore, when density irregularity data is selected immediately before the printing, in reply to the density irregularity data designation signal from the density irregularity data reading section 222, in accordance with the temperature as the attribute data, and sent to the ink-jet printer 210", the maximum effect can be obtained.

According to the present invention, a plurality of attribute data and density irregularity data of a test chart are stored so as to be associated with each other respectively, and the corresponding density irregularity data is read out selectively on the basis of given attribute data, and therefore it is possible to provide an image forming apparatus capable of optimal correction for an input image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    a recording head having a plurality of recording elements for forming an image on a recording medium based on image data;
    a density irregularity characteristics data generating section for generating density irregularity characteristics data by associating: (i) density irregularity data, which is obtained when a density irregularity detector detects a pattern generated with use of the recording head, with (ii) a plurality of attribute data used for forming the pattern; and
    a density irregularity correction section for correcting the image data based on the density irregularity characteristics data generated by the density irregularity characteristics data generating section.

2. An image forming apparatus according to claim 1, further comprising:
    a memory for storing the plurality of attribute data and the density irregularity data in an associated manner as the density irregularity characteristics data.

3. An image forming apparatus according to claim 2, further comprising:
    a density irregularity data reading section for selectively reading out given density irregularity data from the memory based on given attribute data; and
    wherein the density irregularity correction section corrects the image data using the density irregularity data read by the density irregularity reading section.

4. An image forming apparatus according to claim 3, wherein said plurality of attribute data includes density irregularity offset data of a test chart, and the density irregularity data reading section selectively reads the given density irregularity data used for correcting the image data based on the density irregularity offset data.

5. An image forming apparatus according to claim 1, wherein the density irregularity characteristics data generating section is provided in a first data processing device, and the density irregularity correction section is provided in a second data processing device which is positioned separately from the first data processing device.

6. An image forming apparatus according to claim 1, wherein the density irregularity characteristics data generating section is provided in a first data processing device, and the density irregularity correcting section and the recording head are provided in a printer which is positioned separately from the first data processing device.

7. An image forming apparatus according to claim 1, wherein the density irregularity characteristics data generating section is provided in a first data processing device, the memory is provided in a second data processing device which is positioned separately from the first data processing device, and the density irregularity correction section and the recording head are provided in a printer which is positioned separately from at least one of the first and the second data processing devices.

8. An image forming apparatus according to claim 1, wherein the plurality of attribute data includes data regarding at least one of a printing resolution of the recording head, a printing mode of the recording head, a binary method of image processing, a temperature at a printing time, and humidity at the printing time.

* * * * *